US012718085B2

(12) United States Patent
Chow et al.

(10) Patent No.: US 12,718,085 B2
(45) Date of Patent: Aug. 25, 2026

(54) GENERATING NAVIGATIONAL TARGET RECOMMENDATIONS USING PARALLEL NEURAL NETWORKS

(71) Applicant: Oracle International Corporation, Redwood Shores, CA (US)

(72) Inventors: Simon Chow, San Francisco, CA (US); Amir Hossein Rezaeian, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1393 days.

(21) Appl. No.: 17/225,235

(22) Filed: Apr. 8, 2021

(65) Prior Publication Data

US 2022/0327373 A1 Oct. 13, 2022

(51) Int. Cl.
*G06N 3/08* (2023.01)
*G06N 3/045* (2023.01)

(52) U.S. Cl.
CPC ............... *G06N 3/08* (2013.01); *G06N 3/045* (2023.01)

(58) Field of Classification Search
CPC .......... G06N 3/08; G06N 3/045; G06N 3/084; G06F 16/9535
See application file for complete search history.

(56) References Cited

PUBLICATIONS

He ("Mining Implicit Entity Preference from User-Item Interaction Data for Knowledge Graph Completion via Adversarial Learning") TheWeb Conference 2020 (WWW'20), Apr. 20-24, 2020, Taipei, Taiwan. ACM, New York, NY, USA, 12 pages. https://doi.org/10.1145/3366423.3380155 (Year: 2020).*

Yang ("Embedding Entities and Relations for Learning and Inference in Knowledge Bases") Published as conference paper at ICLR 2015 (Year: 2015).*

Mezni ("Context-Aware Service Recommendation Based on Knowledge Graph Embedding") IEEE Transactions on Knowledge and Data Engineering, vol. 34, No. 11, Nov. 2022 Date of publication Feb. 16, 2021 (Year: 2021).*

(Continued)

*Primary Examiner* — Usmaan Saeed
*Assistant Examiner* — Su-Ting Chuang
(74) *Attorney, Agent, or Firm* — Invoke

(57) ABSTRACT

Techniques for generating navigational target recommendations for a user are disclosed. A system propagates sets of user attributes through one neural network and sets of navigational target attributes through another neural network. The neural networks are configured to generate, as outputs, vectors mapped to a same vector space. The system trains the neural networks to identify relationships between the sets of user attributes and the sets of navigational targets. Once the neural networks have been trained, the system generates an embedding for a user by propagating the user's attributes through the trained user attribute neural network. The system also generates embeddings for different navigational targets by propagating the attributes for the different navigational targets through the navigational target neural network. The system identifies relationships between the user and the navigational targets based on the embeddings. The system generates recommendations for navigational targets for the user based on the identified relationships.

24 Claims, 6 Drawing Sheets

(56) References Cited

PUBLICATIONS

Yi ("Sampling-Bias-Corrected Neural Modeling for Large Corpus Item Recommendations" Sep. 16, 2019) RecSys '19, Sep. 16-20, 2019, Copenhagen, Denmark (Year: 2019).*
Krichene ("Efficient Training on Very Large Corpora via Gramian Estimation" Jul. 18, 2018) arXiv:1807.07187v1 [stat.ML] Jul. 18, 2018 (Year: 2018).*
Kenter ("Siamese CBOW: Optimizing Word Embeddings for Sentence Representations" Jun. 15, 2016) arXiv:1606.04640v1 [cs.CL] Jun. 15, 2016 (Year: 2016).*
Rashed ("Attribute-aware non-linear co-embeddings of graph features" Sep. 10, 2019) RecSys '19: Proceedings of the 13th ACM Conference on Recommender Systems (Sep. 2019) (Year: 2019).*
He ("Momentum Contrast for Unsupervised Visual Representation Learning" Mar. 23, 2020) arXiv:1911.05722v3 [cs.CV] Mar. 23, 2020 (Year: 2020).*
Löwe ("Putting an End to End-to-End: Gradient-Isolated Learning of Representations" Jan. 27, 2020) arXiv:1905.11786v3 [cs.LG] Jan. 27, 2020 (Year: 2020).*
Gangadharan ("Paraphrase Detection Using Deep Neural Network Based Word Embedding Techniques" Jun. 15, 2020) Proceedings of the Fourth International Conference on Trends in Electronics and Informatics (ICOEI 2020) (Year: 2020).*
Wu ("Unsupervised Feature Learning via Non-Parametric Instance Discrimination" May 5, 2018) arXiv:1805.01978v1 [cs.CV] May 5, 2018 (Year: 2018).*
Rethmeier ("Long-Tail Zero and Few-Shot Learning via Contrastive Pretraining on and for Small Data") arXiv:2010.01061v3 [cs.CL] Feb. 19, 2021 (Year: 2021).*

* cited by examiner

DISPLAY 512
INPUT DEVICE 514
CURSOR CONTROL 516
MAIN MEMORY 506
ROM 508
STORAGE DEVICE 510
BUS 502
PROCESSOR 504
COMMUNICATION INTERFACE 518
500
NETWORK LINK 520
528
INTERNET
ISP
526
SERVER 530
LOCAL NETWORK 522
HOST 524

GENERATING NAVIGATIONAL TARGET RECOMMENDATIONS USING PARALLEL NEURAL NETWORKS

TECHNICAL FIELD

The present disclosure relates to generating recommendations for navigational targets in a navigational target platform including multiple possible navigational targets for users. In particular, the present disclosure relates to generating recommendations for navigational targets by generating independent embedding vectors for user attributes and navigational target attributes, and generating navigational target recommendations for users based on identifying relationships between the independent vectors.

BACKGROUND

Businesses and individuals utilize a variety of different applications and digital services to perform a variety of tasks. Multi-application software platforms may give operators the ability to access many different types of applications from a centralized user interface. For example, when a user logs into one multi-application software platform, the platform may generate a graphical user interface (GUI) with functionality to allow the user to access applications, services, documents, and files related to human resources, customer acquisition, business operations, accounting, profile information, settings information, and recently-accessed files and documents. Configuring the multi-application software to provide user interface elements for navigational targets for each existing user, and for new users, is a time-consuming process for the users or an administrator.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
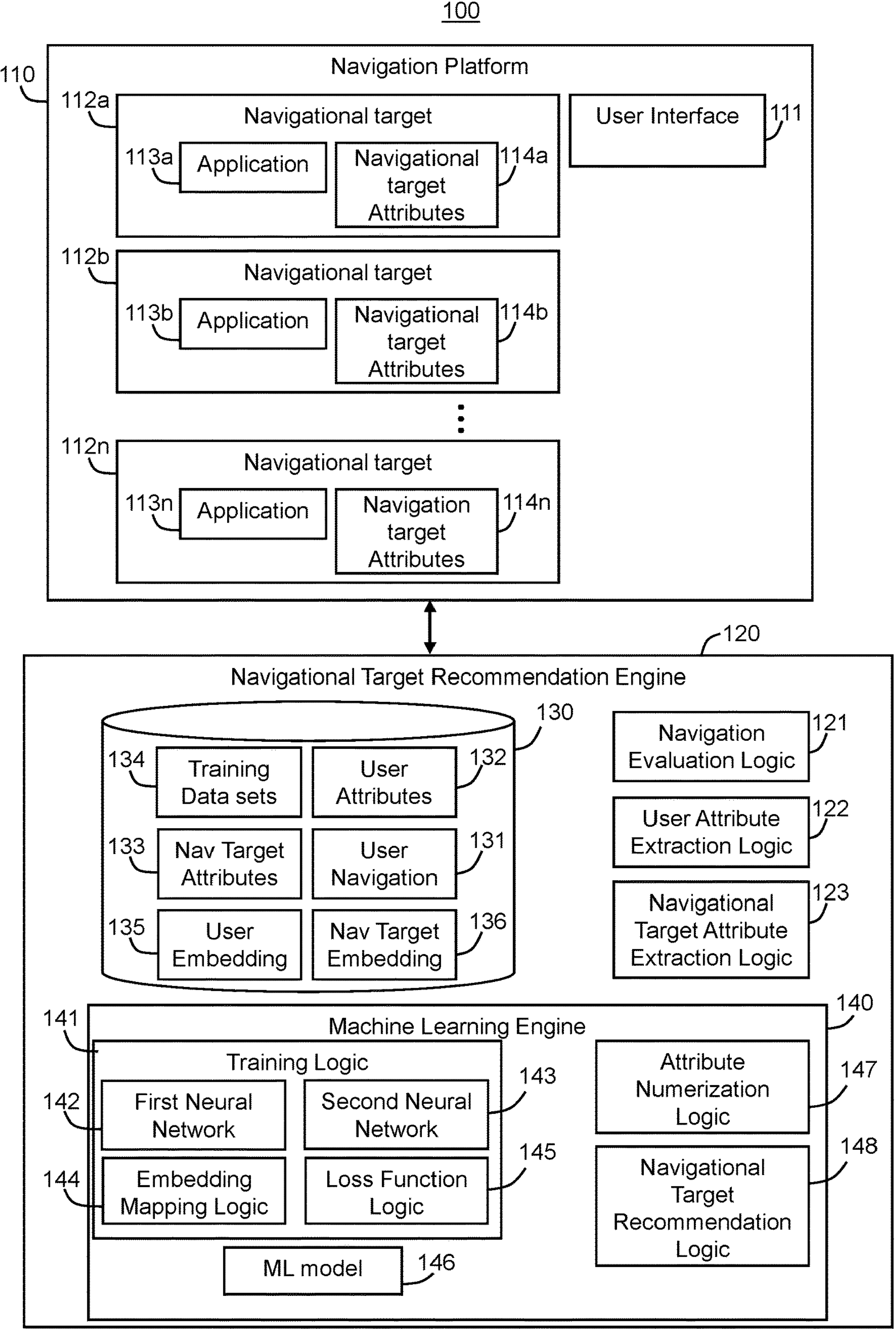
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. SYSTEM ARCHITECTURE
3. GENERATING NAVIGATIONAL TARGET RECOMMENDATIONS USING PARALLEL NEURAL NETWORKS
4. MACHINE LEARNING ENGINE TRAINING
5. EXAMPLE EMBODIMENT
6. COMPUTER NETWORKS AND CLOUD NETWORKS
7. MISCELLANEOUS; EXTENSIONS
8. HARDWARE OVERVIEW

1. General Overview

A navigation platform provides users with access to multiple different applications and services. Each application and service may include many different functions. Each of these functions is a potential navigational target that a user may navigate to within the navigation platform to perform the function. For example, a navigation platform may host applications for an accounting department, a human resources department, a customer service department, and a sales department. An employee in the sales department may access functions in the sales application—such as an application to allow the employee to view sales leads—as well as applications for other departments. For example, the employee may view salary information or an employee directory hosted in the human resources application.

One or more embodiments generate navigational target recommendations for a user by applying a machine learning model to information about the user and to information about each possible navigational target. The machine learning model is made up of two separate neural networks. One neural network is trained on user attributes, such as a user's job type, time employed, and location. The other neural network is trained on navigational target attributes, such as the type of the navigational target, a department associated with the navigational target, and a unique identifier associated with the navigational target. The system trains the two neural networks using a feedback value. The system generates the feedback value by (a) generating two output vectors from the two neural networks, (b) comparing the two output vectors to generate a similarity value, and (c) measuring how different the similarity value is from a value representing an actual user navigation obtained from historical data. As the neural networks are iteratively trained with the feedback values, the similarity value becomes more aligned with the value representing the actual user navigation.

Once the machine learning model has been trained to identify the relationship between one pair of user attributes/navigational target attributes, the system may repeat the process with additional pairs to train the neural networks to determine relationships between all user attributes and navigational target attributes.

Once the neural networks have been trained to identify the relationships between all the user attributes and navigational targets, the system generates an embedding for a particular user by propagating the user's attributes through the trained user attribute neural network. The system also generates embeddings for different navigational targets by propagating the attributes for the different navigational targets through the navigational target neural network. The system identifies relationships between the user and the navigational targets based on the embeddings. The system generates recommendations for navigational targets for the user based on the identified relationships. For example, the system may perform a dot product operation of the user embedding and the navigational target embedding for each navigational target. The dot product operation results in a set of scalar values representing a relationship between the user and each navigational target. The scalar values may be ordered as a ranking. The system may recommend the highest-ranked navigational targets to be accessible to the user. For example, the system may display user interface elements for the highest-ranked navigational targets prominently on a display screen. The system may navigate to the navigation targets based on receiving selections of the corresponding user interface elements.

In one or more embodiments, the user attributes and navigational target attributes include textual and alphanumerical values that must be converted into numerical values to be input into the two neural networks. For example, for some textual attributes the system may perform a hash-vectorizer or count-vectorizer operation to generate numerical values. In order to incorporate the contextual and semantic meaning of textual attributes such as job name, city, or country, a pre-trained word2vec model converts the textual attribute values to numerical vector values. For categorical attributes having low cardinality, the system may perform a one-hot encoding operation to generate numerical values. For alphanumeric values that are not textual, such as navigational target ID values, the system may perform a label encoder to generate numerical values. The numerical values for the different user attributes and navigational target attributes are respectively concatenated to generate the input vectors for the respective neural networks.

In one or more embodiments, the input vectors for the respective neural networks have different numbers of dimensions and different attribute types. For example, the user attribute vector may have sixteen dimensions and the navigational target input vector may have twenty dimensions. The user attribute embedding and the navigational target embedding output from the respective neural networks may have a same number of dimensions.

In one or more embodiments, the two neural networks utilize a negative sampling technique. The neural networks may select from historical navigation data a user navigation to a navigational target. The system obtains the user attributes for the user and navigational target attributes for the navigational target. The actual user navigation is a "true" sample in the negative sampling operation. The system selects K false samples, such as ten false samples for each true sample. The false samples include navigational targets that the user did not navigate to. The system trains the two neural networks using the one true sample and K negative samples. The neural networks may additionally, or in the alternative, be trained using a Softmax final layer, or a GloVe method for training.

In one or more embodiments, the similarity value used for training the neural networks is formed by performing a dot-product or a cosine similarity function on a user attribute embedding and a navigational target embedding. The resulting similarity value represents the machine learning model's determination whether or not the user accessed the navigational target. For example, when a vector representing a known user navigation is mapped in a two-dimensional vector space, a cosine value of "0" for the vector may represent a user not accessing the navigational target and a cosine value of "1" may represent the user accessing the navigational target. The similarity value generated by combining the user attribute vector and the navigational target vector may have a cosine value between "0" and "1." The log-loss function takes as an input the similarity value and the value representing the user navigation. The difference between the similarity value and the value representing the user navigation is used as feedback to the neural networks to adjust the weights of the hidden layers to make the subsequent calculation of the embeddings more accurate. In other words, the difference between the similarity value and the value representing the user navigation is reduced as the neural networks are iteratively trained. In one embodiment, a stochastic gradient descent operation is performed by taking the derivative of the log-loss to minimize the log-loss function.

In one or more embodiments, training the neural networks results in a unique embedding for each user and each navigational target. Navigational targets may be recommended for a user by performing a dot product function of the user embedding with each navigational target embedding to generate a ranking of each navigational target for the user. A predetermined number of navigational targets having the highest rankings may be presented to the user using user interface elements of a graphical user interface (GUI).

One or more embodiments described in this Specification and/or recited in the claims may not be included in this General Overview section.

2. System Architecture

FIG. 1 illustrates a system 100 in accordance with one or more embodiments. As illustrated in FIG. 1, system 100 includes a navigation platform 110 and a navigational target recommendation engine 120. The navigation platform 110 may be a program or set of programs providing access to a suite of applications and services. The navigation platform 110 includes a user interface 111 and navigational targets 112*a*, 112*b*, . . . 112*n*.

In one or more embodiments, user interface 111 refers to hardware and/or software configured to facilitate communications between a user and the navigation platform 110. Interface 111 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of interface 111 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, interface 111 is specified in one or more other languages, such as Java, C, or C++.

The navigational targets 112*a*-112*n* include applications, documents, and executable files. Examples of navigational targets include: a program to review an invoice in an accounting application; a program to store, edit, and display an expense report in an accounting application; a program to store, edit, and display customer and lead contact information in a customer acquisition application; a program to retrieve sales data, and to generate and display a sales forecast in a business operations application; a program to store, edit, and display workflow information of projects in a project management application; a program to store, edit, and display employee information in a human resources application; and a program to retrieve and display compliance data for compliance with government regulations. While the navigational targets, above, are provided by way of example, these are not an exhaustive list of possible navigational targets. Embodiments encompass any program and any application to which a user may navigate to retrieve information and/or perform a function in a navigation platform. In one or more embodiments, the navigation platform 110 generates a user interface element in a GUI of the user interface 111 to allow a user to select the user interface element to access a navigational target 112*a*-112*n*.

Each navigational target 112*a*-112*n* is associated with an application 113*a*-113*n*. Many different navigational targets may belong to the same application. For example, an accounting application includes navigational targets corresponding to different functions in the accounting application, including: generating expense reports; generating financial forecasts; generating payroll information; etc. As another example, a human resources application includes navigational targets that include: view employee list; view and edit employee information; request leave; generate employee performance reports; view organization; etc. Each navigational target 112*a*-112*n* includes navigational target attributes 114*a*, 114*b*, . . . 114*n*. Navigational target attributes store data about the navigational target. Examples of navigational target attributes include: application stripe, product family, view ID, menu ID, taskflow ID, WebAppName, contextualAreaWidth, RecentItemsID, ObjectCode, CreationDate, LastUpdateLogin, LastUpdateDate, EnterpriseID, ParentID, SourceFile. While the navigational target attributes, above, are provided by way of example, these are not an exhaustive list of possible navigational target attributes. Embodiments encompass any information that may be associated with a navigational target to identify attributes of the navigational target.

In one or more embodiments, the navigation platform 110 displays in the GUI of the user interface 111 a set of user interface elements to allow a user to navigate to a corresponding set of navigational targets 112*a*-112*n*. The displayed user interface elements may belong to navigational targets 112*a*-112*n* associated with different applications 113*a*, 113*b*, . . . 113*n*. In addition, or in the alternative, the displayed user interface elements may belong to different documents or executable files within the same application.

The navigational target recommendation engine 120 provides recommendations to the navigation platform 110 for navigational targets for a particular user. The navigational target recommendation engine 120 includes a data repository 130. In one or more embodiments, a data repository 130 is any type of storage unit and/or device (e.g., a file system, database, collection of tables, or any other storage mechanism) for storing data. Further, a data repository 130 may include multiple different storage units and/or devices. The multiple different storage units and/or devices may or may not be of the same type or located at the same physical site. Further, a data repository 130 may be implemented or may execute on the same computing system as the navigation platform 110 or the navigational target recommendation engine 120. Alternatively, or additionally, a data repository 130 may be implemented or executed on a computing system separate from the navigation platform 110 or the navigational target recommendation engine 120. A data repository 130 may be communicatively coupled to the navigation platform 110 or the navigational target recommendation engine 120 via a direct connection or via a network.

The navigational target recommendation engine stores historical user navigation data 131 obtained from the navigation platform 110. The navigation evaluation logic 121 identifies, in the historical user navigation data 131, the frequency with which each user selects each navigational target. For each pair of user/navigational target, user attribute extraction logic 122 extracts user attributes 132 and navigational target attribute extraction logic 123 extracts navigational target attributes 133. Information describing user navigation 131, user attributes 132, navigational target attributes 133, training data sets 134, user embeddings 135, and navigational target embeddings 136 may be implemented across any of components within the system 100. However, this information is illustrated within the data repository 130 for purposes of clarity and explanation.

The navigational target recommendation engine 120 generates the recommendations using the machine learning engine 140. The machine learning engine 140 includes training logic 141. The attribute numerization logic 147 converts alphanumeric user attribute values and navigational target attribute values to numerical values that can be analyzed by the first and second neural networks 142 and 143. A set of user attributes, converted to numerical values, is provided to the first neural network 142 as an input data set to generate an output user embedding 135. A set of navigational target attributes, converted to numerical values, is provided to the second neural network 143 as an input data set to generate an output navigational target embedding 136. The embeddings 135 and 136 are vectors having a same number of dimensions as each other. While the input data sets provided to the first neural network 142 and the second neural network 143 include different types of numerical values generated by different numerization functions and representing different types of information, the neural networks 142 and 143 convert the input data sets into vectors having the same number of dimensions as each other. In one embodiment, the input data sets have more dimensions than the output embeddings. For example, the user attribute data set may have twenty dimensions, and the output user embedding may have five dimensions. Similarly, the navigational target input data set may have thirty dimensions, and the output navigational target embedding may have five dimensions.

In one or more embodiments, the training logic 141 implements a negative sampling function. For example, the training logic 141 may determine that a particular user accessed a particular navigational target. The pairing of the user attributes for the particular user and the navigational target attributes for the particular navigational target may constitute a true sample. The training logic 141 applies a logistic regression model to train the neural networks 142 and 143 using a predetermined number of false samples (e.g., 10 false samples) and the one true sample. In addition, or in the alternative, the training logic 141 may implement a Softmax final layer or a GloVe function.

The training logic 141 includes embedding mapping logic 144 to map the user embedding and the navigational target embedding 136 to the same vector space. The training logic 141 further includes loss function logic 145 to compare a similarity value of the two embeddings to a value representing a known user navigation to generate a feedback value for training the hidden layers of the first neural network 142 and the second neural network 143. Upon training the neural networks 142 and 143 to the set of user attributes and the set of navigational target attributes, the machine learning engine 140 stores a machine learning model 146 for predicting whether a user having a particular set of attributes is likely to select a navigational target having a particular set of attributes. The navigational target recommendation logic 148 uses the embeddings generated by the machine learning model 146 for sets of user attributes and sets of navigational target attributes to generate recommendations for navigational targets to be made accessible to a particular user.

In one or more embodiments, once the machine learning model 146 is trained, a set of user attributes for each user may be propagated through the trained first neural network 142 to generate, for each user, a separate user embedding 135. Similarly, a set of navigational target attributes for each navigational target may be propagated through the trained second neural network 143 to generate, for each navigational target, a separate navigational target embedding 136.

In one or more embodiments, the navigational target recommendation logic 148 includes logic to perform a dot-product function using a user embedding and each navigational target embedding, respectively. The resulting list of products represents, for each user, a ranking of all of the navigational targets. For example, the navigational target recommendation logic 148 may perform a dot-product function on the user embedding for the user, "Alan," and each navigational target, NavTarget1, NavTarget2 . . . NavTarget1000. The resulting list of dot products may be ordered according to the highest values: Alan·NavTarget33; Alan·NavTarget522; Alan·NavTarget4 . . . Alan·NavTarget762. In such an embodiment, the highest dot products may represent the navigational targets most likely to be utilized by "Alan." The navigation platform 110 may display a set of user interface elements for the ten highest-ranked navigational targets on the user interface 111 for the user "Alan."

In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Additional embodiments and/or examples relating to computer networks are described below in Section 6, titled "Computer Networks and Cloud Networks."

In one or more embodiments, the navigational target recommendation engine 120 refers to hardware and/or software configured to perform operations described herein for using training a machine learning model to generate recommendations for navigational targets for users. Examples of operations for generating navigational target recommendations using parallel neural networks are described below with reference to FIG. 2. Examples of operations for training a machine learning model are described below with reference to FIG. 3.

In an embodiment, the navigational target recommendation engine 120 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

Figure 2:
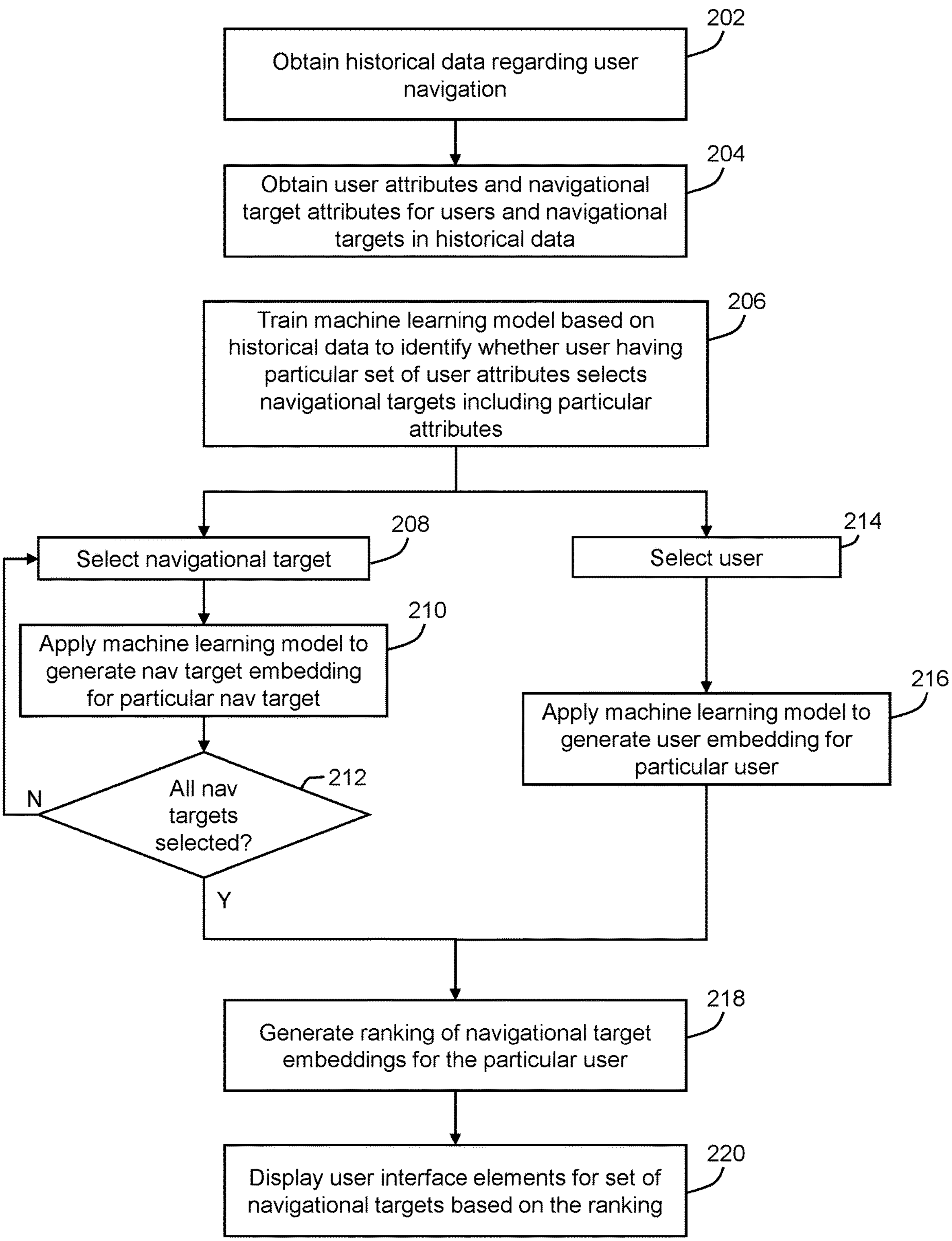
FIG. 2 illustrates an example set of operations for training a machine learning model to recommend navigational targets for users in accordance with one or more embodiments.

3. Generating Navigational Target Recommendations Using Parallel Neural Networks FIG. 2 illustrates an example set of operations for generating navigational target recommendations in a navigation platform in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

A system obtains historical data regarding user navigation (Operation 202). The historical data includes, for each user, a record of navigational targets that the user has selected or accessed and time information regarding when the user accessed the navigational targets. Time information includes a record of the times the user accessed the navigational target.

The system obtains the user attributes and navigational target attributes for the users and the navigational targets in the historical data (Operation 204). The user attributes and navigational target attributes are alphanumeric values specifying characteristics of a user or navigational target, respectively. In one or more embodiments, the historical data includes user attributes and navigational target attributes. Alternatively, the system may identify a user and navigational target from the historical data, and the system may retrieve attribute information from one or more data repositories.

The system trains a machine learning model based on the historical data to identify whether a user, including a particular set of user attributes, selects a navigational target, including a particular set of navigational target attributes (Operation 204). In one embodiment, the system trains the machine learning model by using parallel neural networks for the user attributes and the navigational target attributes, respectively. The system converts input data sets for the attribute values to an output user embedding and an output navigational target embedding. The system combines the embeddings in a same vector space to generate a similarity value, such as a dot product, of the embeddings. In addition, or in the alternative, the similarity value may be based on a cosine similarity, a Pearson correlation, or a 2-norm of a difference between the two embeddings. The system generates a feedback value based on the similarity value. The system iteratively provides the feedback value to the parallel neural networks to train the parallel neural networks to identify the likelihood of particular sets of attribute values corresponding to selections of particular navigational targets. The trained parallel neural networks specify the machine learning model.

The system selects a particular navigational target for generating an embedding for the navigational target (Operation 208). The particular navigational target may be selected from among the navigational targets in the historical data. Alternatively, the particular navigational target may be selected from among the navigational targets to which the system gives users access.

The system applies the trained machine learning model to the set of attribute values for the selected navigational target to generate an embedding for the particular navigational target (Operation 210). The system converts alphanumeric attribute values into numerical attribute values. The system concatenates the numerical attribute values to generates an input data set for the trained machine learning model. The trained machine learning model generates an embedding for the particular navigational target that is stored as an attribute of the particular navigational target.

The system determines whether each navigational target has been selected (Operation 212). In one embodiment, the system sequentially selects each navigational target in the historical data. In the alternative, the system may sequentially select each navigational target that is being maintained by the system. In another embodiment, the system detects the creation of a new navigational target in the system. If the system determines that additional navigational targets have not yet been selected to have embeddings generated for the navigational targets, the system selects a next navigational target (Operation 208).

The system selects a particular user for generating an embedding for the user (Operation 214). For example, the system may detect a new user, whose information is not contained in the historical data, accessing the system. Alternatively, the system may select one or more users from among the users in the historical data to generate user embeddings. For example, in one embodiment, the system identifies every user in the historical data who is currently employed by the enterprise that maintains the system. In another embodiment, the system identifies every user in the historical data who has accessed the system within a predetermined period of time.

The system applies the user attributes of each selected user to the trained machine learning model to generate a user embedding for the user (Operation 216). The system converts alphanumeric attribute values into numerical attribute values. The system concatenates the numerical attribute values to generates an input data set for the trained machine learning model. The trained machine learning model generates an embedding for the particular user that is stored as an attribute of the particular user.

Using the user embedding and the navigational target embeddings, the system generates a ranking of the navigational targets for the user (Operation 218). In one embodiment, the system performs a dot-product function of the user embedding with each navigational embedding to generate a dot product for each pair of a user embedding and a navigational embedding. The values of the dot products may be used to rank the navigational targets for the user. For example, if the user embedding is represented as: (−0.502, 3.610), and if three navigational target embeddings are represented as: NavTarget1(1.101, 4.567), NavTarget2 (2.145, −1.822), NavTarget3(−1.677, 5.045), the dot-products of the user embedding and the navigational target embeddings result in: 15.934168, −7.65421, 19.054304. The system may rank the navigational targets according to the dot-products as follows: NavTarget3 (Rank1), NavTarget1 (Rank2), NavTarget2(Rank3).

The system displays user interface elements for a set of navigational targets based on the ranking (Operation 220). In one embodiment, the system displays user interface elements for navigational targets only having a predetermined ranking. For example, in one embodiment, only ten user interface elements are displayed on a particular GUI panel. The system may select the ten highest-ranked navigational targets for display in the GUI panel. In addition, or in the alternative, the system may position the navigational targets having higher rankings in a region of a GUI panel that is accessed more often by a user than other regions. For example, the system may position user interface elements for higher-ranked navigational targets towards a top of a viewing area of a GUI and interface elements for lower-ranked navigational targets towards a bottom of the viewing area of the GUI.

4. Machine Learning Engine Training

Figure 3:
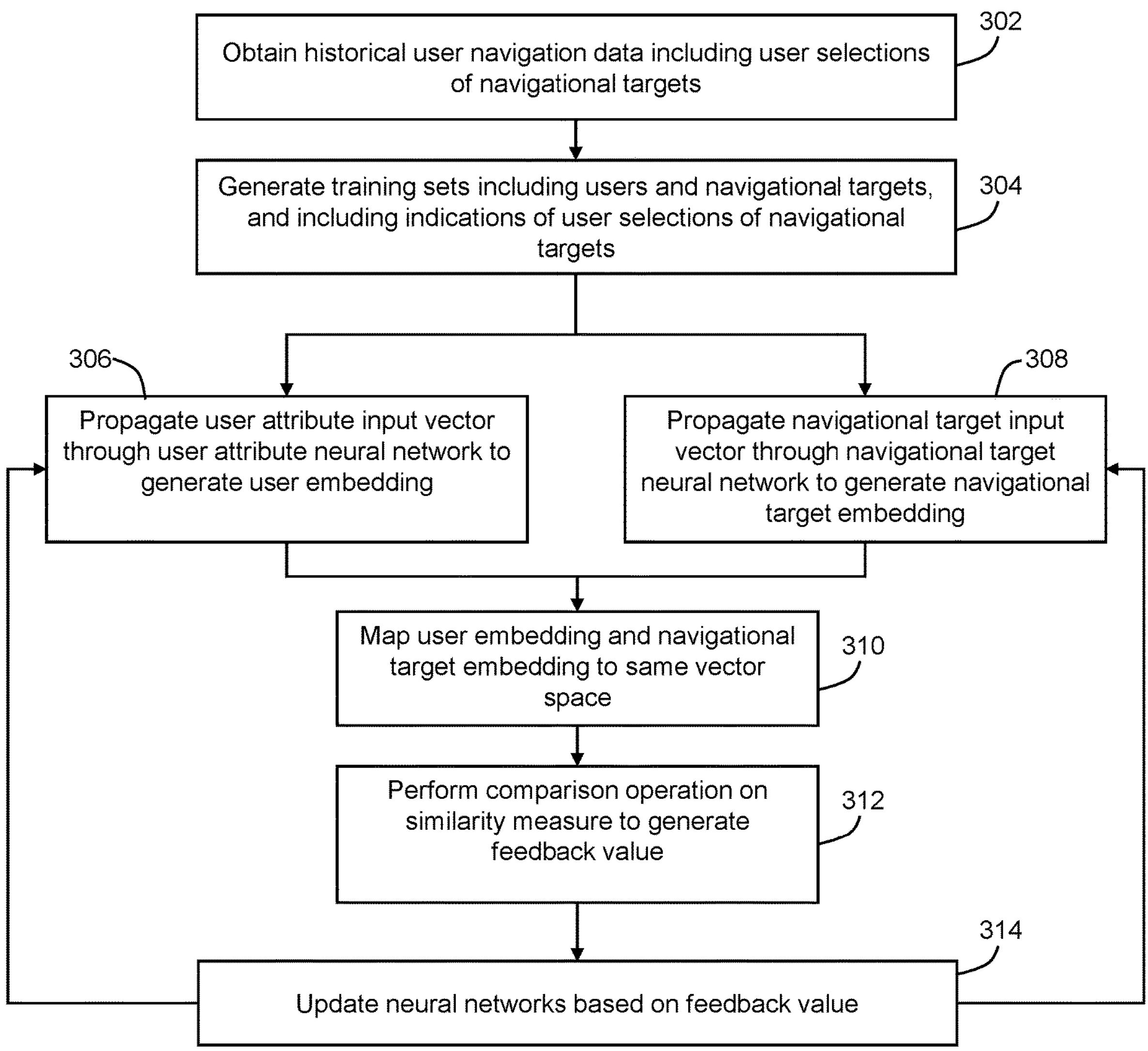
FIG. 3 illustrates an example set of operations for generating recommendations for navigational targets for users in accordance with one or more embodiments.

FIG. 3 illustrates an example of a set of operations for training a machine learning engine according to one or more embodiments.

A machine learning engine obtains historical user navigation data (Operation 302). The historical user navigation data identifies users and navigational targets accessed by users. For example, a navigation platform may give users access to many different applications and many different processes, documents, and functions within each application. Each process, document, and function that may be accessed by a user may be a separate navigational target. The historical user navigation data includes information about how often each user accesses each process, document, and function in each application provided by the navigation platform.

The machine learning engine generates training sets of users and navigational targets (Operation 304). The machine learning engine obtains a set of user attributes for a user and a set of navigational target attributes for a navigational target.

In one embodiment, the machine learning engine identifies in the historical data a user navigation to a navigational target. The machine learning engine obtains a set of user attributes for the user and a set of navigational target attributes for the selected navigational target.

The machine learning engine converts alpha-numerical attributes into numerical attribute values. The machine learning engine may apply different conversion functions to different types of alpha-numerical values. For example, a first user attribute may be a textual user attribute, such as a city name or job name. The machine learning engine may convert textual user attributes into numerical values using a pre-trained word2vec model. The resulting numerical values may be vectors representing semantic representations of the text value of the user attribute. An example vector for a city "Atlanta" may be [−1.255, 0.021]. An example vector for a city "Los Angeles" may be [2.145, 0.689]. A second user attribute may be a value having low cardinality, such as a "work group," where there may only be five possible work groups. The machine learning engine may convert the name of the work group to numerical values using one-hot encoding. For example, an engineering work group may have a numerical value of 0,0,0,1,0. A sales work group may have a numerical value of 1,0,0,0,0. A third user attribute may be an alphanumeric value that is not textual. For example, an attribute "taskflowID" may have a value "ZZ1134J." The machine learning engine may convert the attribute value for the third attribute into a numerical value using a hash-vectorizer or count-vectorizer.

The machine learning engine generates a set of user attribute input data by concatenating the user attribute values, converted into numerical values, into a single input vector. Similarly, the machine learning engine generates a set of navigational target input data by concatenating the navigational target attribute values, converted into numerical values, into a single input vector. For example, the user attribute input vector generated based on the user attribute values [City: Atlanta, Work Group: Engineering, TaskFlowID: ZZ1134J, . . . ] may have a format [−1.255, 0.021, 0,0,0,1,0, 3.665, 7.432, 0.1276, . . . ]

Each number in the input vector is a dimension of the input vector. In one or more embodiments, the number of dimensions of the user attribute input vector is different than the number of dimensions of the navigational target input vector. Alternatively, the user attribute input vector may have a same number of dimensions as the navigational target input vector. In one or more embodiments, the user attributes are different than the navigational target attributes. For example, the user attributes may have different names and may be of different types (e.g., textual, high/low cardinality, non-textual alphanumeric) than the navigational target attributes.

The machine learning engine propagates the user attribute input vector through a neural network to generate a user attribute embedding (Operation 306). The neural network includes an input layer, a set of hidden layers, and an output layer. The output layer outputs the user attribute embedding. The user attribute embedding is a vector belonging to a particular vector space. In one embodiment, the user attribute embedding includes fewer dimensions than the user attribute input vector. For example, the user attribute input vector may include twenty-four dimensions, and the user attribute embedding may include three dimensions.

The machine learning engine propagates the navigational target input vector through a separate neural network to generate a navigational target embedding (Operation 308). In one or more embodiments, the navigational target embedding is a vector that includes the same number of dimensions as the user attribute embedding. In the alternative, if the navigational target embedding has different dimensions than the user attribute embedding, the machine learning engine performs padding on one of the embeddings to give the embeddings the same dimensions.

In one or more embodiments, the hidden layers of the user attribute neural network and the navigational target neural network comprise sets of neurons, each comprising a matrix or tensor to perform a transform using outputs from neurons of a previous layer. In an initial iteration of the user attribute input vector, the machine learning engine may assign a default value to the weights as in the entries in the matrix or tensor. For example, the weights may be assigned a random value between 0 and 1. Alternatively, the weights may be assigned values based on previously-propagated sets of user attributes.

The machine learning engine maps the user attribute embedding and the navigational target embedding to the same vector space (operation 310). In one or more embodiments, the machine learning engine performs a dot-product function of the user embedding and the navigational target embedding. The machine learning engine may transpose one of the user embedding or the navigational target embedding prior to performing the dot-product function.

The machine learning engine generates a feedback value by performing comparison operation on the similarity value resulting from the dot-product operation (Operation 312). In one or more embodiments, the machine learning engine compares a value representing a user navigation to the similarity value. The machine learning engine calculates the difference between the value representing the user navigation and the similarity value. The difference represents the variation of the user attribute embedding and the navigational target embedding from the actual user navigation. The machine learning engine generates a feedback value based on the difference.

In one or more embodiments, the machine learning engine applies a sigmoid function to the similarity value to convert the similarity value to a value between 0 and 1, corresponding to a "false" label and a "true" label. The user-selection value may have a value of "0" or "1," where 0 indicates the user did not navigate to the target and 1 indicates the user navigated to the target. For example, if the historical data indicates that the user accessed the navigational target, the user navigation value may have a value of "1." The machine learning engine may then compare the output of the sigmoid function to the user-selection value. The difference between the output of the sigmoid function and the user-selection value may be a feedback value.

In one or more embodiments, the machine learning engine generates the similarity value based on the user attribute embedding and the navigational-target embedding by performing a dot product function, a cosine similarity function, a Pearson correlation function, or another function to identify a relationship between the embeddings. The machine learning engine performs the sigmoid function on the result to fit the result to a value between 0 and 1. The machine learning engine may calculate a difference between the similarity value and the value representing the user selection from historical data to calculate a feedback value that represents how far the machine learning model is from an accurate determination whether the user accessed the navigational target. For example, the machine learning engine may calculate the difference between 1 and the similarity value when the user navigation value is "1", indicating the user navigated to the navigation target. The machine learning engine may calculate the difference between 0 and the similarity value when the user navigation value is "0," indicating the user did not navigate to the target. The machine learning training process may perform a stochastic gradient descent operation to train the weights in a model. The stochastic gradient descent operation quantifies a log loss derivative of the labeled value ("0" or "1"), representing an actual user navigation from historical data, and the sigmoid function on the similarity value. The machine learning engine may use the output value from the stochastic gradient descent operation as the feedback value.

The machine learning engine uses the feedback value to update the neural networks. The machine learning engine back propagates the feedback value through the pair of neural networks to adjust the weights in the neural network matrix or tensors by a gradient of the loss function. (Operation 314). Consequently, when the machine learning engine re-propagates the input vectors through the neural networks, the new weights of the neural network generate new embedding values for the user attribute embedding and the navigational-target embedding that are in closer alignment. In addition, a resulting similarity value is closer to the value representing the user selection from historical data. As the machine learning engine trains the neural networks by iteratively adjusting the neuron weights based on the feedback values, the user attribute embedding and the navigational-target embedding become more aligned with a vector of the user navigation that actually took place. The machine learning engine repeats the training with multiple epochs of the same training data set and with additional training data sets to iteratively improve the weights of the neural networks to generate more accurate embeddings.

In one or more embodiments, the machine learning engine trains the neural networks using a negative sampling operation. The output of the neural networks may be applied to a logistic regression model to return a value of 0 or 1. A value of 0 may signify that the user did not access the navigational target. A value of 1 may signify that the user did access the navigational target. The machine learning engine begins with the determination that the user accessed the navigational target. The machine learning engine uses the user attributes and navigational target attributes of the selecting user and the accessed navigational target as a true sample. The machine learning engine generates K false samples, such as 10 false samples. The false samples comprise sets of navigational target attributes that belong to navigational targets the user did not access. The false samples may be selected from the historical data by identifying the navigational targets the user did not access. The false samples may be a set of navigational targets selected at random from among the navigational targets the user did not access.

The machine learning engine propagates the true sample through the neural networks to identify the similarity value for the true sample. The machine learning engine also propagates the false samples through the neural networks. As the false samples are iteratively propagated through the neural networks, the hidden layers are trained to carry weights that convert the user attributes and navigational target attributes to a user attribute embedding and a navigational target embedding.

As described in FIG. 2, once the neural networks are trained, resulting in a pair of machine learning models, the machine learning engine propagates user attributes and navigational target attributes through the models to generate a user embedding for each user and a navigational target embedding for each navigational target. A navigational target recommendation engine generates a set of recommended navigational targets for the user based on the embeddings.

5. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 4A:
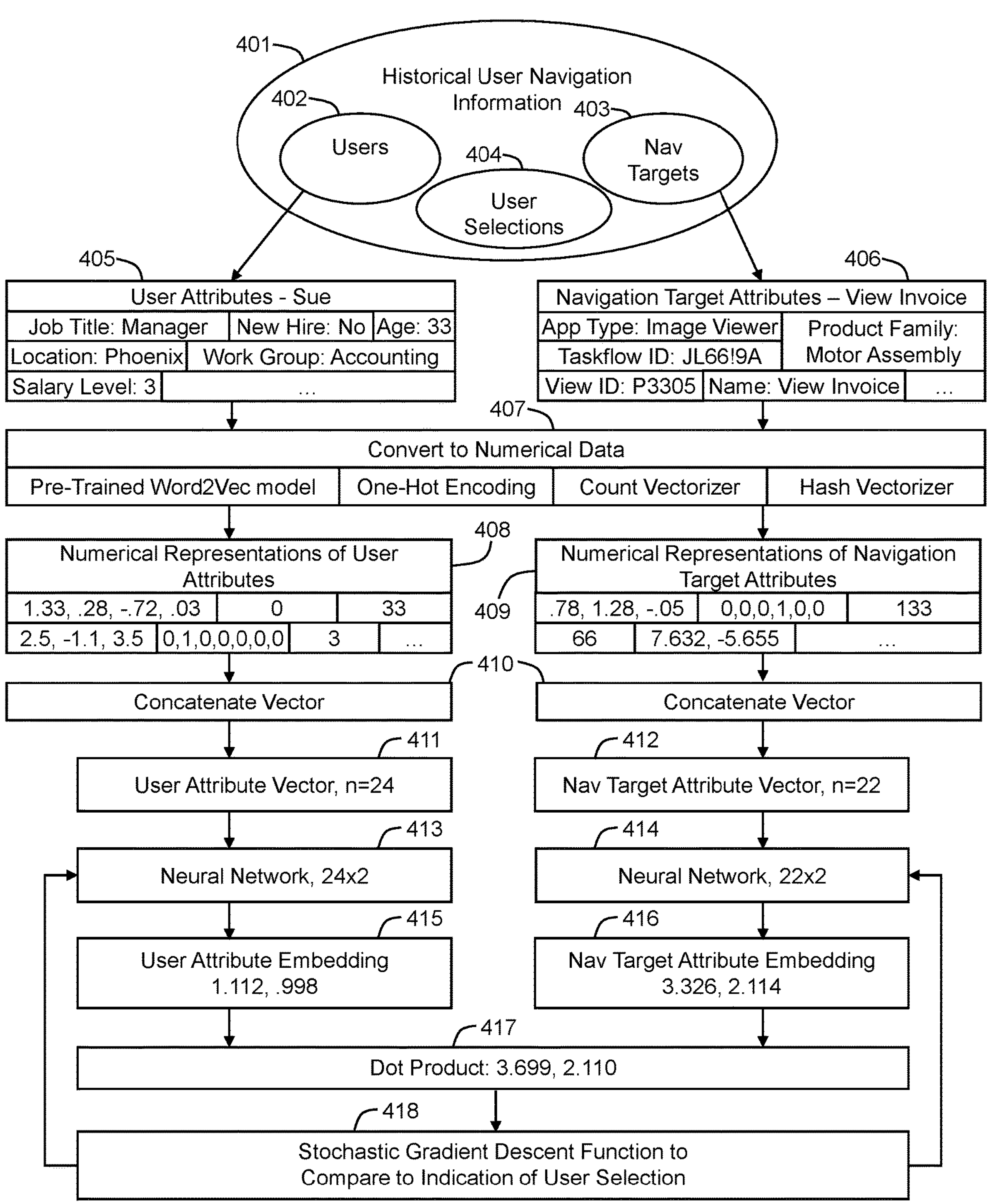
FIGS. 4A and 4B illustrate an example embodiment.
Figure 4B:
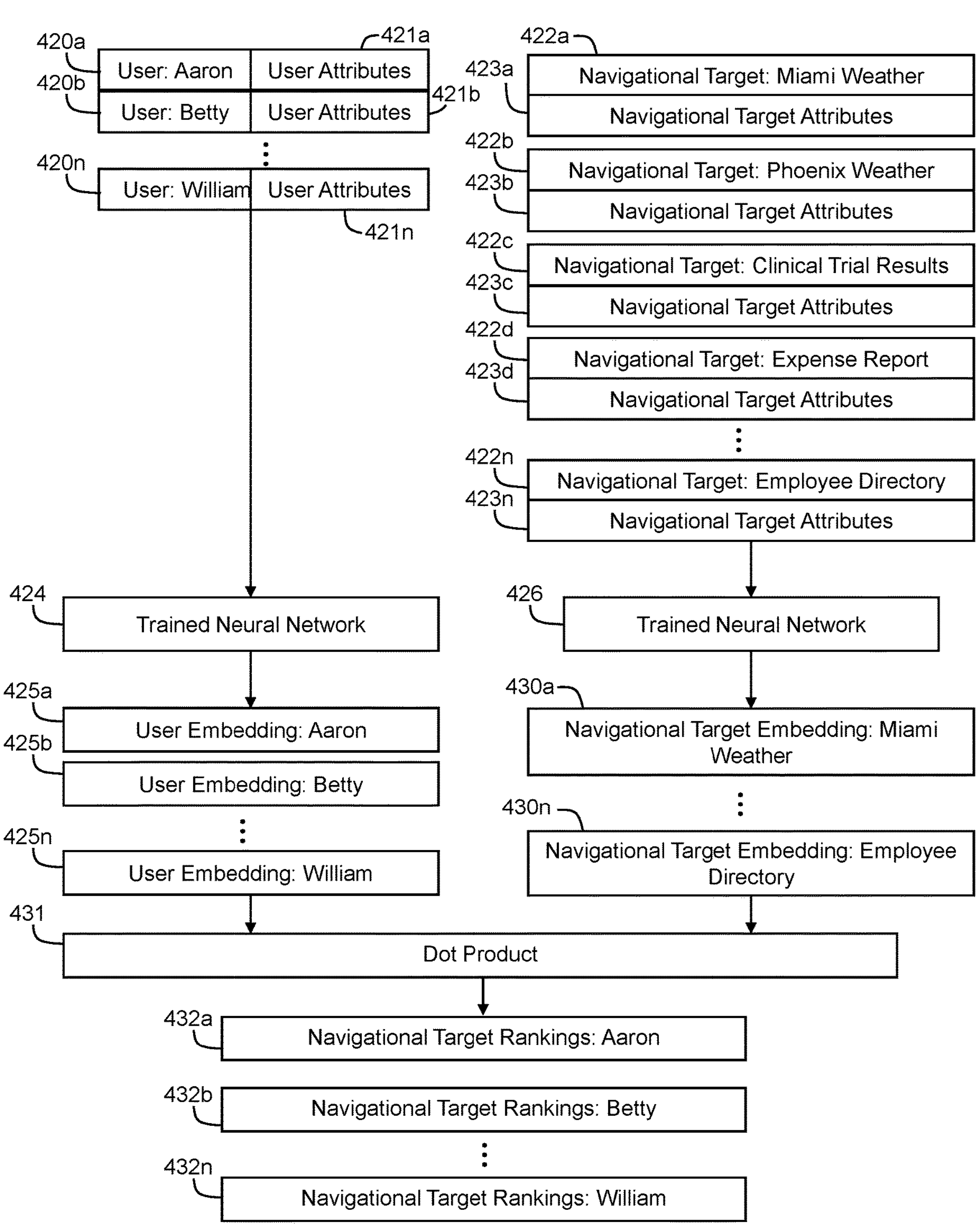

FIGS. 4A and 4B illustrate an example embodiment of training a machine learning model and generating recommendations for navigational targets for a user. As illustrated in FIG. 4A, a machine learning engine obtains historical user navigation information 402. The historical user navigation information includes information regarding users 402, navigational targets 403, and the selections 404 of the navigational targets by the users.

The machine learning engine selects pairs of users/navigational targets as a data set for training a machine learning model. In FIG. 4A, a first user, Sue, is selected and the machine learning engine obtains the attributes 405 for Sue. The user attributes include "Job Title," "New Hire?", "Age," "Location," "Work Group," and "Salary Level." Additional user attributes are indicated by the ellipses in FIG. 4A.

The machine learning engine selects a navigational target to be paired with the user, Sue. In FIG. 4A, the navigational target is the operation "View Invoice." The machine learning engine obtains the navigational target attributes 406 for the selected navigational target. The navigational target attributes include "App Type," "Product Family," "View ID", "TaskFlowID," and "Name." Additional navigational targets are indicated by the ellipses in FIG. 4A.

The machine learning engine converts alphanumeric attribute values for the user attributes and the navigational target attributes into numerical values (Operation 407). The machine learning engine applies a pre-trained word2vec model to the attribute value "manager" to generate a vector value. The machine learning engine converts the "Yes/No" value for the attribute "New Hire" to a "0." The machine learning engine leaves the numerical value "33" intact, without performing any conversion. The machine learning engine applies one-hot encoding to convert the work group value "accounting" into a numerical value "0,1,0,0,0,0,0."

The machine learning engine applies a count vectorizer to the attribute value for the Taskflow ID (JL66!9A) to generate a numerical value of "133." The machine learning engine applies a hash vectorizer to the attribute value for the View ID (P3305) to generate a numerical value of "66."

The machine learning engine concatenates the numerical values for the user attributes and the numerical values for the navigational target attributes (Operation 410). The results of the concatenations are a user attribute input vector 411 and a navigational target attribute input vector 412. The user attribute input vector has 24 dimensions, and the navigational target attribute vector has 22 dimensions.

The machine learning engine propagates the user attribute vector 411 through a neural network 413. The machine learning engine propagates the navigational target attribute vector 412 through a separate neural network 414. The neural network 413 is structured to have twenty-four input dimensions and two output dimensions. The neural network 414 is structured to have twenty-two input dimensions and two output dimensions.

The neural network 413 initially outputs a user attribute embedding 415 with a value of [1.112, 0.998]. The neural network 414 initially outputs a navigational target attribute embedding 416 with a value of [3.326, 2.114]. The machine learning engine performs a dot-product function 417 on the user attribute embedding 415 and the navigational target attribute embedding 416 to calculate a dot product result of 5.888.

The machine learning engine performs a stochastic gradient descent operation 418 on the dot product and a value representing whether the user accessed the navigational target. The stochastic gradient descent operation identifies a difference between the value representing the actual user selection and a sigmoid of the dot product. The machine learning engine performs a loss function of the calculated difference to generate a feedback value. The machine learning engine adjusts the weights, or coefficients, of the neural networks 413 and 414 based on the feedback value. The machine learning engine iteratively propagates, in multiple epochs of mini-batches, the vectors 411 and 412 through the neural networks 413 and 413, generates the feedback value, and adjusts the weights of the neural networks 413 and 414 until loss function value representing the difference between the similarity value resulting from the dot product operation 417 and the value representing the user accessed the navigational target is within a predetermine range. For example, the machine learning engine may determine that the neural networks 413 and 414 are sufficiently trained on the user/navigational target pair when the difference between the similarity value and the value representing the user accessed the navigational target is less than 10%.

The machine learning engine may continue to train the neural networks 413 and 414 using additional pairs of users/navigational targets.

FIG. 4B illustrates a process by which the navigational target recommendation engine uses the trained neural networks to generate recommended navigational targets for users. The navigational target recommendation engine sequentially selects users 420_a_, 420_b_, . . . 420_n_ for propagation through the trained neural network 424. Each user 420_a_, 421_b_, . . . 420_n_ includes a corresponding set of user attributes 421_a_, 421_b_ . . . 421_n_. The navigational target recommendation engine propagates the user attributes 421_a_ for the user 420_a_, Aaron, through the trained neural network 428 to obtain a user embedding 425_a_ for the user 420_a_, Aaron. The user embedding 425_a_ may be saved as an attribute 421_a_ of the user 420_a_, Aaron. The navigational target recommendation engine repeats the process of propagating sets of user attributes through the trained neural network 424 for the additional users 420_b_-420_n_. The corresponding user embeddings 425_b_-425_n_ are saved as user attributes for the respective users 420_b_-420_n_.

The navigational target recommendation engine sequentially selects navigational targets 422_a_-422_n_ for propagation through the trained neural network 425. Each navigational target 422_a_-422_n_ includes a corresponding set of user attributes 423_a_-423_n_. In one or more embodiments, the number of navigational targets is substantially more than the number of users. For example, the number of navigational targets may be between one to three orders of magnitude greater than the number of users. The navigational target recommendation engine propagates the navigational target attributes 423_a_ for the navigational target 422_a_, "Miami Weather," through the trained neural network 426 to obtain a navigational target embedding 430_a_ for the navigational target 422_a_, "Miami Weather." The navigational target embedding 430_a_ may be saved as an attribute 423_a_ of the navigational target 422_a_, "Miami Weather." The navigational target recommendation engine repeats the process of propagating sets of navigational target attributes through the trained neural network 426 for the additional navigational targets 422_b_-422_n_. The corresponding user embeddings 430_b_-430_n_ are saved as navigational target attributes 423_b_-423_n_ for the respective navigational targets 422_b_-422_n_.

The navigational target recommendation engine generates a ranking of the navigational targets for each user by selecting a user and performing a dot product of the user embedding and the embeddings for each navigational target. For example, the navigational target recommendation engine selects the user embedding 425_a_ for the user 420_a_, Aaron, and sequentially performs a dot product operation 431 with the user embedding 425_a_ and each navigational target embedding 430_a_-430_n_. The resulting set of relatedness values may be arranged according to magnitude to generate navigational target rankings 432_a_ for the user 420_a_, Aaron. The navigational target recommendation engine repeats the process of generating navigational target rankings 432_b_-432_n_ for the remaining users.

When the user 420_a_, Aaron, accesses a user interface, a navigation platform may obtain the rankings 432_a_ from the navigational target recommendation engine. The navigation platform may cause the user interface to display selectable user interface elements for a set of the highest-ranked navigational targets for the user 420_a_. The user interface elements may be selectable by the user to navigate to the navigational targets.

6. Computer Networks and Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 5:
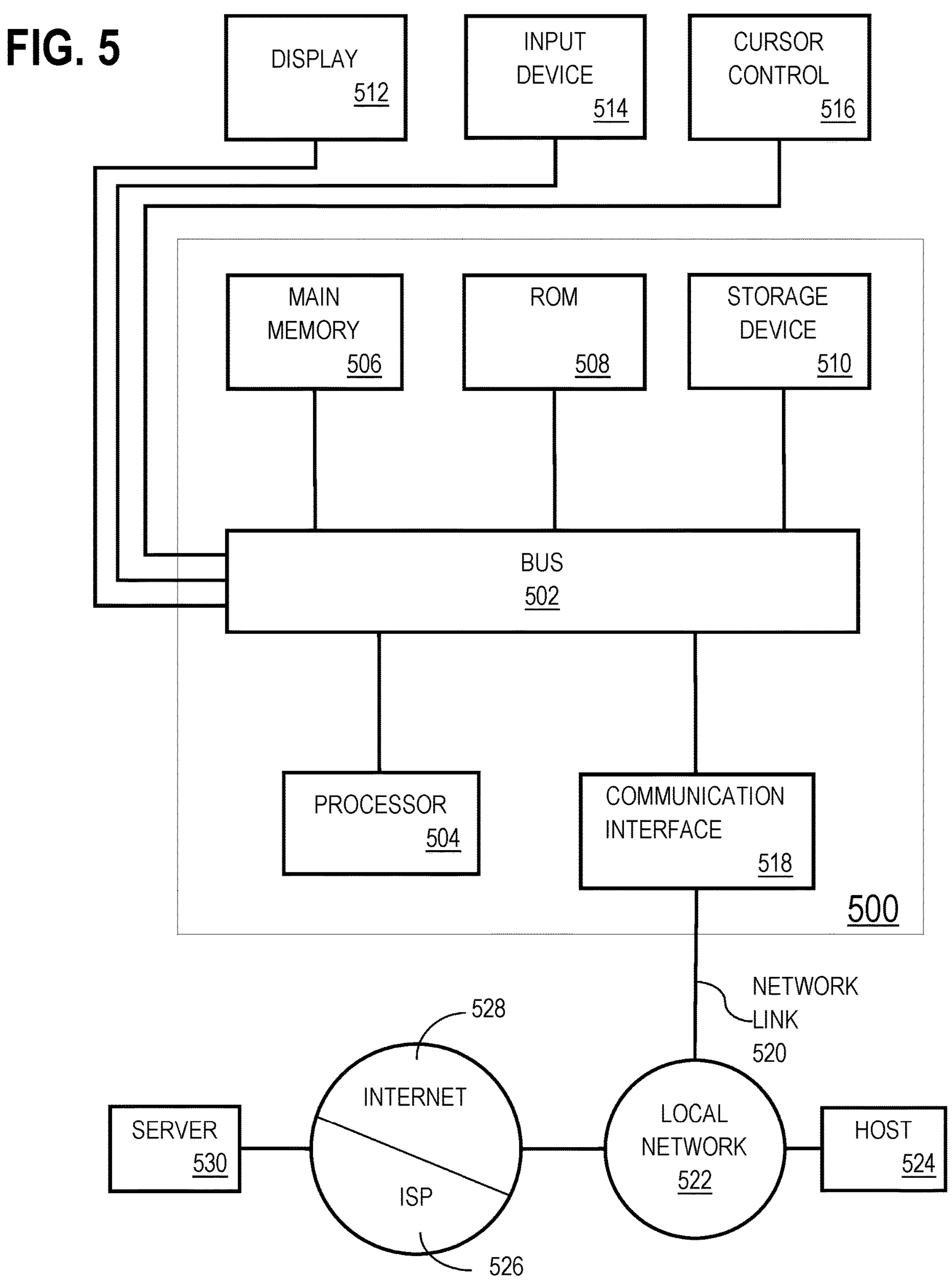
FIG. 5 shows a block diagram that illustrates a computer system in accordance with one or more embodiments.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the worldwide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause performance of operations comprising:

generating a trained machine learning model to recommend navigational targets at least by:

obtaining training data sets of historical user navigation data, each training data set comprising:

a particular navigational target, from among a plurality of navigational targets, the particular navigational target associated with a plurality of navigational target attributes;

a particular user among a plurality of users, the particular user being associated with a plurality of user attributes; and a binary value representing whether the particular user accessed the particular navigational target;

based on the training data sets, generating a first vector representing the plurality of user attributes associated with the particular user;

applying the first vector to a first neural network to generate a first user attribute embedding, wherein the first vector omits the plurality of navigational target attributes;

based on the training data sets, generating a second vector representing a plurality of navigational-target attributes associated with the particular navigational target;

applying the second vector to a second neural network to generate a first navigational-target attribute embedding, wherein the second neural network is different from the first neural network, and wherein the second vector omits the plurality of user attributes;

generating a feedback value based on a correlation between: (a) a measured relationship between the first user attribute embedding and the first navigational-target attribute embedding, and (b) the binary value representing whether the particular user accessed the particular navigational target;

based on the feedback value, updating at least one of the first neural network and the second neural network;

identifying a first set of user attributes associated with a first user; and applying (a) the first neural network of the trained machine learning model to the first set of user attributes and (b) the second neural network of the trained machine learning model to sets of navigational target attributes associated respectively with a plurality of candidate navigational targets to determine a set of one or more recommended navigational targets for the first user.

2. The media of claim 1, wherein the first vector and the second vector have a different number of dimensions from each other, and wherein the first neural network and the second neural network are configured such that the first user attribute embedding and the first navigational-target attribute embedding have a same number of dimensions.

3. The media of claim 1, wherein the first vector includes more dimensions than the first user attribute embedding, and wherein the second vector includes more dimensions than the first navigational-target attribute embedding.

4. The media of claim 1, wherein generating the feedback value comprises:

mapping the first user attribute embedding and the first navigational-target attribute embedding onto a same vector space; and applying a log-loss function to a similarity value calculated based on a relationship between the first user attribute embedding and the first navigational-target attribute embedding mapped to the same vector space.

5. The media of claim 4, further comprising performing a stochastic gradient descent operation on the log-loss function.

6. The media of claim 4, wherein mapping the first user attribute embedding and the first navigational-target attribute embedding onto the same vector space comprises performing a dot-product function on the first user attribute embedding and the first navigational-target attribute embedding.

7. The media of claim 1, wherein the operations further comprise:

generating the first vector by converting non-numerical attribute values for the plurality of user attributes into numerical values, including performing two or more operations on at least two different user attributes among the plurality of user attributes, the two or more operations comprising:

applying a pre-trained word2vec model;

performing one-hot encoding;

applying a hash vectorizer; and applying a count vectorizer.

8. The media of claim 1, wherein the operations further comprise:

generating the first vector by converting non-numerical attribute values for the plurality of user attributes into numerical values; and concatenating the numerical values for the non-numerical attribute values into a single user attribute input vector.

9. The media of claim 1, wherein determining the set of one or more recommended navigational targets for the first user comprises:

propagating the first set of user attributes through the trained machine learning model to generate a first user embedding;

propagating the sets of navigational target attributes for the plurality of navigational targets through the trained machine learning model to generate a set of navigational target embeddings;

performing a dot-product function on the first user embedding and, respectively, each of the set of navigational target embeddings to generate a plurality of relatedness values corresponding, respectively, to the plurality of navigational targets;

ranking each navigational target, among the plurality of navigational targets, according to a respective relatedness value of the plurality of relatedness values; and generating the set of one or more recommended navigational targets for the first user according to the ranking of each navigational target.

10. The one or more non-transitory machine-readable media of claim 1, wherein the binary value is one of a first alphanumeric value representing the particular user accessed the particular navigational target and a second alphanumeric value representing the particular user did not access the particular navigational target.

11. The one or more non-transitory machine-readable media of claim 1, wherein generating the feedback value further comprises:

selecting a plurality of negative samples, each negative sample comprising a navigational target that the particular user did not access; and generating the feedback value based on the first user attribute embedding and the first navigational-target attribute embedding using the binary value and the plurality of negative samples.

12. The one or more non-transitory machine-readable media of claim 1, wherein generating the feedback value further comprises:

selecting a plurality of negative samples, each negative sample comprising a navigational target that the particular user did not access; and generating the feedback value based on the first user attribute embedding and the first navigational-target attribute embedding using the binary value and the plurality of negative samples, wherein selecting the plurality of negative samples comprises:

identifying, in the historical user navigation data, a set of navigational targets that the particular user did not access; and randomly selecting the plurality of negative samples from among the set of navigational targets that the particular user did not access.

13. The one or more non-transitory machine-readable media of claim 1, wherein the operations further comprise:

selecting, from among users represented in the historical user navigation data, a subset of users who have accessed a navigation platform within a predetermined period of time; and generating a user embedding for each user in the subset of users by applying the first neural network to a respective set of user attributes.

14. A method, comprising:

generating a trained machine learning model to recommend navigational targets at least by:

obtaining training data sets of historical user navigation data, each training data set comprising:

a particular navigational target, from among a plurality of navigational targets, the particular navigational target associated with a plurality of navigational target attributes;

a particular user among a plurality of users, the particular user being associated with a plurality of user attributes; and a binary value representing whether the particular user accessed the particular navigational target;

based on the training data sets, generating a first vector representing the plurality of user attributes associated with the particular user;

applying the first vector to a first neural network to generate a first user attribute embedding, wherein the first vector omits the plurality of navigational target attributes;

based on the training data sets, generating a second vector representing a plurality of navigational-target attributes associated with the particular navigational target;

applying the second vector to a second neural network to generate a first navigational-target attribute embedding, wherein the second neural network is different from the first neural network, and wherein the second vector omits the plurality of user attributes;

generating a feedback value based on a correlation between: (a) a measured relationship between the first user attribute embedding and the first navigational-target attribute embedding, and (b) the binary value representing whether the particular user accessed the particular navigational target;

based on the feedback value, updating at least one of the first neural network and the second neural network;

identifying a first set of user attributes associated with a first user; and applying (a) the first neural network of the trained machine learning model to the first set of user attributes and (b) the second neural network of the trained machine learning model to sets of navigational target attributes associated respectively with a plurality of candidate navigational targets to determine a set of one or more recommended navigational targets for the first user.

15. The method of claim 14, wherein the first vector and the second vector have a different number of dimensions from each other, and wherein the first neural network and the second neural network are configured such that the first user attribute embedding and the first navigational-target attribute embedding have a same number of dimensions.

16. The method of claim 14, wherein the first vector includes more dimensions than the first user attribute embedding, and wherein the second vector includes more dimensions than the first navigational-target attribute embedding.

17. The method of claim 14, wherein generating the feedback value comprises:

mapping the first user attribute embedding and the first navigational-target attribute embedding onto a same vector space; and applying a log-loss function to a similarity value calculated based on a relationship between the first user attribute embedding and the first navigational-target attribute embedding mapped to the same vector space.

18. The method of claim 17, further comprising performing a stochastic gradient descent operation on the log-loss function.

19. The method of claim 17, wherein mapping the first user attribute embedding and the first navigational-target attribute embedding onto the same vector space comprises performing a dot-product function on the first user attribute embedding and the first navigational-target attribute embedding.

20. The method of claim 14, further comprising:

generating the first vector by converting non-numerical attribute values for the plurality of user attributes into numerical values, including performing two or more operations on at least two different user attributes among the plurality of user attributes, the two or more operations comprising:

applying a pre-trained word2vec model;

performing one-hot encoding;

applying a hash vectorizer; and applying a count vectorizer.

21. The method of claim 14, further comprising:

generating the first vector by converting non-numerical attribute values for the plurality of user attributes into numerical values; and concatenating the numerical values for the non-numerical attribute values into a single user attribute input vector.

22. The method of claim 14, wherein determining the set of one or more recommended navigational targets for the first user comprises:

propagating the first set of user attributes through the trained machine learning model to generate a first user embedding;

propagating the sets of navigational target attributes for the plurality of navigational targets through the trained machine learning model to generate a set of navigational target embeddings;

performing a dot-product function on the first user embedding and, respectively, each of the set of navigational target embeddings to generate a plurality of relatedness values corresponding, respectively, to the plurality of navigational targets;

ranking each navigational target, among the plurality of navigational targets, according to a respective relatedness value of the plurality of relatedness values; and generating the set of one or more recommended navigational targets for the first user according to the ranking of each navigational target.

23. A system, comprising:

one or more processors; and memory storing instructions that, when executed by the one or more processors, cause the system to perform:

generating a trained machine learning model to recommend navigational targets at least by:

obtaining training data sets of historical user navigation data, each training data set comprising:

a particular navigational target, from among a plurality of navigational targets, the particular navigational target associated with a plurality of navigational target attributes;

a particular user among a plurality of users, the particular user being associated with a plurality of user attributes; and a binary value representing whether the particular user accessed the particular navigational target;

based on the training data sets, generating a first vector representing the plurality of user attributes associated with the particular user;

applying the first vector to a first neural network to generate a first user attribute embedding, wherein the first vector omits the plurality of navigational target attributes;

based on the training data sets, generating a second vector representing a plurality of navigational-target attributes associated with the particular navigational target;

applying the second vector to a second neural network to generate a first navigational-target attribute embedding, wherein the second neural network is different from the first neural network, and wherein the second vector omits the plurality of user attributes;

generating a feedback value based on a correlation between: (a) a measured relationship between the first user attribute embedding and the first navigational-target attribute embedding, and (b) the binary value representing whether the particular user accessed the particular navigational target;

based on the feedback value, updating at least one of the first neural network and the second neural network;

identifying a first set of user attributes associated with a first user; and applying (a) the first neural network of the trained machine learning model to the first set of user attributes and (b) the second neural network of the trained machine learning model to sets of navigational target attributes associated respectively with a plurality of candidate navigational targets to determine a set of one or more recommended navigational targets for the first user.

24. The system of claim 23, wherein determining the set of one or more recommended navigational targets for the first user comprises:

propagating the first set of user attributes through the trained machine learning model to generate a first user embedding;

propagating the sets of navigational target attributes for the plurality of navigational targets through the trained machine learning model to generate a set of navigational target embeddings;

performing a dot-product function on the first user embedding and, respectively, each of the set of navigational target embeddings to generate a plurality of relatedness values corresponding, respectively, to the plurality of navigational targets;

ranking each navigational target, among the plurality of navigational targets, according to a respective relatedness value of the plurality of relatedness values; and generating the set of one or more recommended navigational targets for the first user according to the ranking of each navigational target.

* * * * *